United States Patent [19]

Bennett

[11] 4,011,026

[45] Mar. 8, 1977

[54] INTERLOCK CUTTING TOOL HOLDER

[75] Inventor: Gene Lee Bennett, North Madison, Ohio

[73] Assignee: Genio Tools, Inc., Mentor, Ohio

[22] Filed: Mar. 21, 1974

[21] Appl. No.: 453,218

Related U.S. Application Data

[63] Continuation-in-part of Ser. No. 277,636, Aug. 3, 1972, Pat. No. 3,907,453.

[52] U.S. Cl. .................................. 408/199; 29/97; 408/239 R

[51] Int. Cl.² ......................................... B23B 29/03

[58] Field of Search .......... 408/146, 186, 189, 191, 408/197, 198, 199, 223, 224, 227, 228, 231, 233, 238, 239, 713; 29/97, 95.1, 104; 82/36 R

[56] References Cited

UNITED STATES PATENTS

| | | | |
|---|---|---|---|
| 433,458 | 8/1890 | Eberhardt | 29/104 |
| 1,725,299 | 8/1929 | Pickin | 408/224 X |
| 1,941,790 | 1/1934 | Davis | 408/227 |
| 2,125,005 | 7/1938 | Jearum | 408/146 X |

FOREIGN PATENTS OR APPLICATIONS

| | | | |
|---|---|---|---|
| 812,249 | 5/1937 | France | 29/104 |

*Primary Examiner*—Othell M. Simpson
*Assistant Examiner*—Z. R. Bilinsky
*Attorney, Agent, or Firm*—Meyer, Tilberry & Body

[57] ABSTRACT

A cutting tool holder includes an elongated holder body having a first end face through which passes a shaft receiving bore which extends longitudinally through the holder body to receive an elongated tool mounting shaft therein. The tool mounting shaft has an end collar at one end and is threaded at its opposite end to be releasably fastened to the holder body with the shaft extending through the holder body, and the tool mounting portion of the shaft protruding therefrom. A plurality of substantially disc-shaped shaft mounted members, including cutting tools and spacers, have opposite faces and are received in face-to-face relationship on the tool mounting portion of the shaft, between the end collar and the holder body end face. The end collar and each shaft-mounted member is provided with locator means comprising complementary-shaped recesses (holes or grooves) and protrusions (pins or bars) formed, respectively, on the adjacent faces thereof. With the shaft-mounted members properly positioned on the shaft, facing locator means interlock with each other and with the end collar to form a rigid, interlocked assembly of shaft-mounted members on the shaft. The shaft and associated shaft mounted members are tightened against the holder body in any selected rotational orientation thereto by a threaded shaft-engaging unit.

4 Claims, 14 Drawing Figures

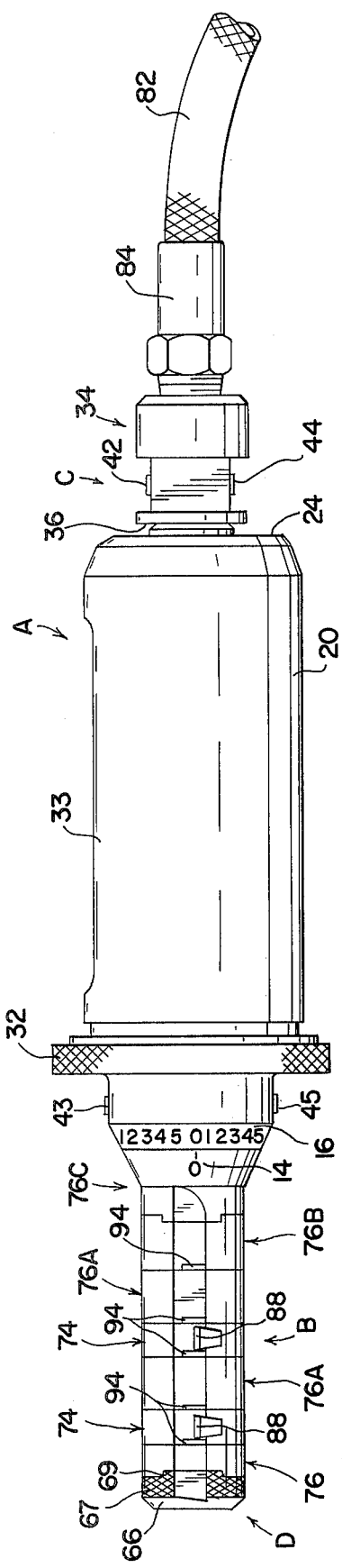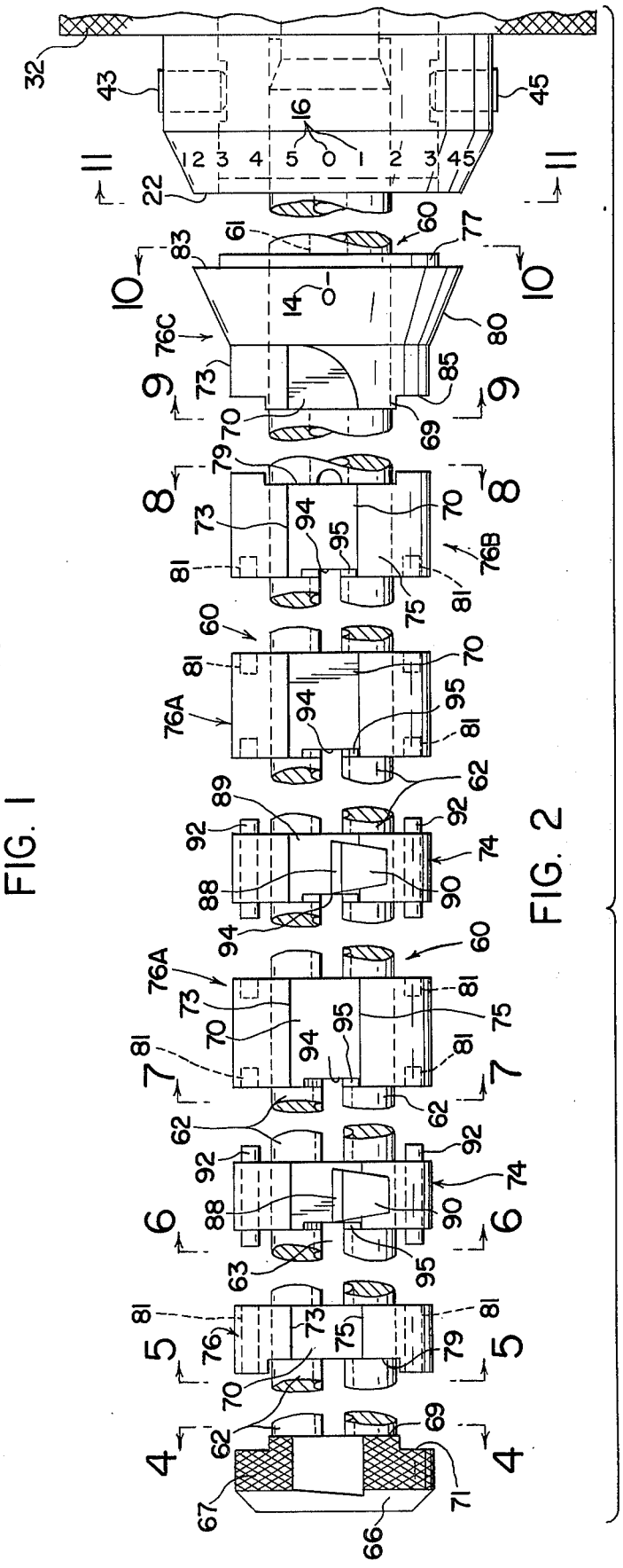
FIG. 1
FIG. 2

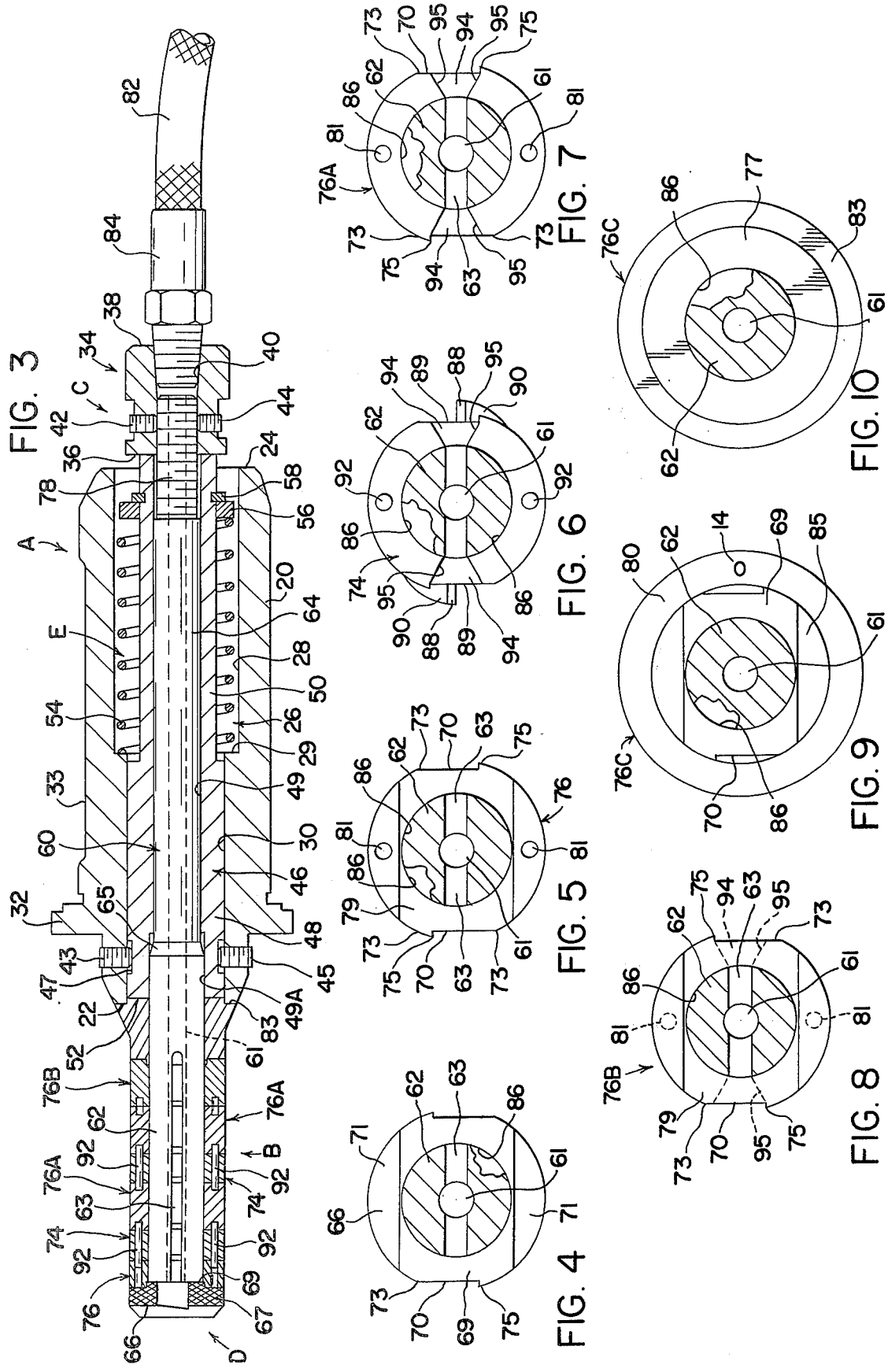

INTERLOCK CUTTING TOOL HOLDER

This application is a continuation-in-part of my copending application Ser. No. 277,636, filed Aug. 3, 1972, now U.S. Pat. No. 3,907,453 and pertains to the art of metal removal tools, and more particularly to a metal removal tool holder.

The invention is particularly applicable to a tool holder for grooving tools for either internal or external grooving operations and will be described with particular reference thereto; however, it will be appreciated by those skilled in the art that the invention has broader applications and may be used with metal removal or cutting tools other than those normally employed for grooving operations.

Heretofore, in performing grooving (or other metal cutting or removal) operations, the grooving tools have been generally rigidly affixed to an elongated tool mounting shaft. The tool mounting shaft has then been slideably received in an elongated shaft-receiving bushing or sleeve holder for mounting in the metal removal machine itself. Oftentimes, the shaft-receiving bushing or sleeve holder merely comprised a split-sleeve type of bushing wherein no means were provided to positively locate the tool mounting shaft therein. This was particularly disadvantageous when it became necessary to remove the tool mounting shaft from the bushing for purposes of resharpening the cutting tools themselves. Upon replacement in the metal removal machine, it was then necessary to repeat the steps of properly positioning the tool mounting shaft in order that the cutting tools would be in the desired location relative to the workpieces themselves. This is particularly important when a plurality of identical workpieces are to be sequentially processed as, for example, on a production line.

A further difficulty with this prior type of cutting tool mounting arrangement was that the cutting tools themselves were rigidly affixed to the tool mounting shafts. Thus, if a tool broke or was merely worn out, it became necessary to replace both the cutting tool and tool member mounting shaft. Also, if a different type or size of cut was desired, still further cutting tool member mounting shaft combinations were required. This requirement necessitated maintaining a substantial inventory of parts in order to permit a machine shop to efficiently and properly function, particularly when multiple cutting point tools are used wherein the spacing between the cutting tool as well as their size are of substantial significance.

My above mentioned copending application Ser. No. 277,636, the disclosure of which is incorporated herein by reference, discloses a cutting tool holder which, among other things, overcomes the foregoing prior art problems by providing for mounting cutting tools and spacer members upon a tool mounting shaft and holding them in place thereon by a slot and key arrangement. A slot is provided longitudinally along the tool mounting shaft which is aligned so that the slot therein lines up with a corresponding slot formed within the shaft-receiving bore of the holder body. The key member extends coextensively within the two slots, holding the shaft and the holder body in the desired alignment. The slot in the shaft, and the key, extend beyond the holder body along the tool mounting portion of the shaft. Each cutting tool and spacer member has a corresponding slot formed along the mounting portion thereof so that the portion of the key protruding beyond the holder body serves to hold the cutting tools and spacer members in alignment with the mounting shaft. In this manner, the shaft, the cutting tools and the spacer members are maintained in preselected alignment by means of the slot and key arrangement with the holder body.

While the foregoing described improved cutting tool holder of my copending application represents a significant advance over the prior art, it does have a drawback in that it is time consuming to disassemble and reassemble the shaft-mounted cutting tools and spacer members on the mounting shaft. In order to provide a tight, non-chattering fit, the key and the corresponding slots in the shaft, cutting tools and spacer members are formed to very close fitting tolerances, and this makes it somewhat difficult and time consuming to slide the shaft mounted members over the length of the keyed mounting shaft, as required in assembly and disassembly.

Further, the keyway and key construction described in my aforesaid copending patent application necessarily requires orienting the tool mounting shaft so that the keyway slot therein aligns with the corresponding keyway slot in the holder body.

The present invention contemplates a new and improved device which overcomes all of the above referred problems and others and provides a new cutting tool holder which is simple, economical, and versatile in order to facilitate interchanging of cutting tools in a single tool holder.

The present invention provides a novel design for a cutting tool holder for maintaining at least one cutting tool in a desired spaced relationship relative to a workpiece as the tool and workpiece are engaged for performing a cutting operation. The holder comprises an elongated holder body having first and second spaced apart end faces and a first coaxial bore extending therethrough along the longitudinal axis thereof. The holder body further has locating flat portions formed on the outer surfaces thereof, whereby the body is adapted to be readily affixed to a conventional metal removal machine. An elongated tool mounting shaft has a tool mounting portion and a shaft mounting portion, the latter being dimensioned to be slideably received in said first bore from the first end face so as to extend substantially longitudinally through the holder body. Means are provided for engaging the shaft mounting portion in the vicinity of the second end face of the holder body in order to retain the tool mounting shaft in a desired position within the bore, with the tool mounting portion protruding therefrom. Biasing spring means disposed in the holder body are provided to help hold the mounting shaft in the selected position relative thereto.

In accordance with the invention, shaft mounted cutting tools and shaft mounting spacers have opposite first and second faces and are mounted upon the tool mounting portion of the mounting shaft and rigidly affixed relative thereto by locator means provided on said first and second faces. (For convenience of expression, the shaft mounting cutting tools and shaft mounted spacers are sometimes hereinafter and in the claims collectively referred to as "shaft-mounted members".) The tool mounting portion of the mounting shaft contains shaft-carried locator means at the end thereof remote from the holder body, which locator means interlocks with complementary locator means on the face of the shaft-mounted member adjacent the shaft-carried locator means. Locator means on each successive shaft mounted member interlock the shaft and shaft-mounted members in predetermined, rigid orientation relative to each other. A shaft engaging means secures the shaft to the body holder in any selected rotational orientation therewith.

In a preferred embodiment of the invention, the shaft-carried locator means comprises a drive bar mounted on the interior face of an end collar affixed to the end of the mounting shaft remote from the holder body, and the adjacent face of the shaft mounted member adjacent the end collar has locator means comprising a correspondiing shaped groove, interlockable with the drive bar.

The shaft-mounted members are interlocked, one to the other, by a series of locator means carried on the faces thereof, these locator means comprising locator pins and complementary locator holes and/or locator bars and complementary locator grooves on, respectively, adjacent faces of the shaft mounted members.

The various locator bars, grooves, pins and holes serve to locate, respectively, shaft mounted members in a given rotational orientation on the mounting shaft, and to interlock the shaft mounted members with each other and with the mounting shaft.

In accordance with another aspect of the present invention, the mounting shaft is selectively rotatable through 360° of rotation within the holder body, and the body and mounting shaft further include means thereon for indicating the relative positions thereof from a first normal position through one revolution thereabout. Such rotation permits the utilization of cutting tools with multiple cutting elements thereon because the cutting tool elements may be rotated within the holder body to engage alternate sets of the cutting elements on the tools with the workpiece.

In accordance with another aspect of the present invention, there is included means for supplying a continuous fluid flow to the cutting tool elements.

In accordance with still another aspect of the present invention, biasing means may be provided for selectively biasing the mounting shaft longitudinally relative to the holder body, i.e., imposing a force which tends to move the shaft relative to the holder body in a direction parallel to the longitudinal axis thereof.

In accordance with still another aspect of the present invention, there is provided a new cutting tool particularly adapted for use with a tool holder of the type including an elongated holder body adapted to be affixed to a conventional metal removal machine and wherein the body has an elongated tool mounting shaft extending coaxially outwardly therefrom, and having shaft-mounted members, including cutting tools, mounted thereon.

The cutting tools are generally disc-shaped, having first and second opposite contact faces, a centered mounting hole therein, dimensioned to be closely received over the mounting shaft, locator means on each of its two faces, and at least one cutting element extending generally radially outwardly therefrom. Preferably the cutting elements extend in a plane substantially parallel to the planes of the first and second contact faces.

In accordance with still another aspect of the present invention, spacer members adapted to be mounted on said tool shaft to space the cutting tools one from the other are provided. The spacer members are generally disc-shaped and have first and second opposite faces, a centered mounting hole portion dimensioned to be closely received over the mounting shaft, and locator means on both faces thereof.

In accordance with another aspect of the invention, locator means on some shaft-mounted members comprise locator recesses formed in the faces thereof. The recesses may be in the form of holes, grooves or other convenient shapes, and may either be formed separately in the opposite faces of the shaft-mounted members, or may extend from the first to the second face thereof, forming a passageway through the shaft-mounted member. Locator means on other shaft-mounted members may comprise locator projections extending outwardly from both the first and second faces thereof. The shaft-mounted members are arranged on the shaft so that complementary locator projections and locator recesses face each other, and engage each other to interlock the shaft-mounted members, one with the other, and with the tool shaft.

In accordance with yet another aspect of the invention, the shaft-mounted members contain fluid release chambers formed in the faces thereof, which chambers are in flow communication with a fluid escape channel formed in the tool shaft so as to permit the escape of a fluid therefrom, through and around the cutting tool members, particularly the cutting elements thereof.

The principal object of the present invention is the provision of a cutting tool holder which permits rapid and easy assembly and disassembly thereof; which provides the capability of utilizing multiple tool elements on each cutting tool member, and the spaced mounting of a plurality of cutting tools thereon; which permits rotating the setting of the cutting tools to present alternate sets of tool elements to the workpiece, which provides a large flow of fluid, such as a coolant liquid, through and around the cutting tool members, and which permits repeated accurate location of a cutting tool relative to a metal removal apparatus and relative to a workpiece.

Other objects of the present invention are the provision of a cutting tool holder which is simple in design, which is easy to manufacture, which facilitates the use of a plurality of different cutting tools therewith, which is readily adaptable to use in a plurality of metal removal operations, and which permits removal and relocation of the cutting tools relative to the tool holder in a quick and easy manner.

The invention may take physical form in certain parts and arrangements of parts, a preferred embodiment of which will be described in detail in this specification and illustrated in the accompanying drawings which form a part hereof and wherein:

FIG. 1 is a side view in elevation of a tool holder comprising one embodiment of the invention;

FIG. 2 is an exploded, enlarged side elevation view with parts broken away, of the tool holder shown in FIG. 1;

FIG. 3 is a longitudinal cross-sectional side view in elevation of the tool holder shown in FIG. 1;

FIG. 4 is a cross-sectional view taken along line 4—4 of FIG. 2;

FIG. 5 is a cross-sectional view taken along line 5—5 of FIG. 2;

FIG. 6 is a cross-sectional view taken along line 6—6 of FIG. 2;

FIG. 7 is a cross-sectional view taken along line 7—7 of FIG. 2;

FIG. 8 is a cross-sectional view taken along line 8—8 of FIG. 2;

FIG. 9 is a cross-sectional view taken along line 9—9 of FIG. 2;

FIG. 10 is a cross-sectional view taken along line 10—10 of FIG. 2;

Figure 11:
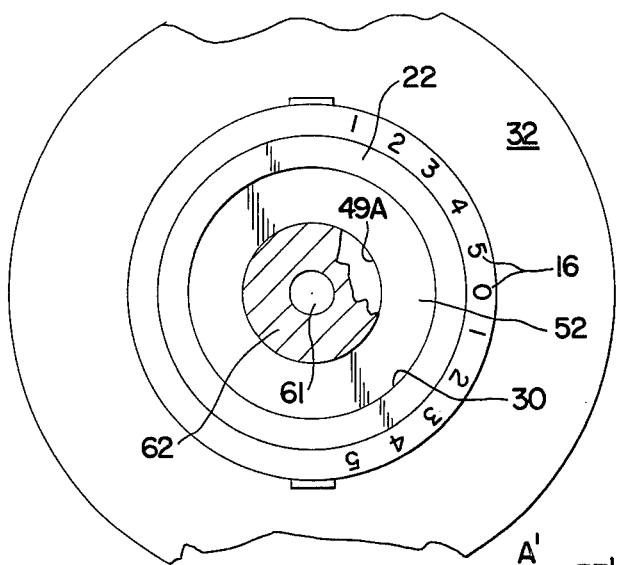
FIG. 11 is a cross-sectional view taken along line 11—11 of FIG. 2.

Referring now to the drawings wherein the showings are for purposes of illustrating the preferred embodiment of the invention only and not for purposes of limiting same, FIGS. 1, 2 and 3 generally show a tool holder portion A, a cutting tool mounting portion B, a shaft engaging means C, a shaft mounted stop means D, and (FIG. 3) a mounting shaft biasing means E.

Referring now primarily to FIGS. 1, 2 and 3, tool holder body A is comprised of an elongated body 20 having a first end face 22 and a second end face 24. A bore 26 extends longitudinally through the body between first and second end faces 22, 24. Bore 26 includes a first, enlarged bore portion 28 extending inwardly from second end face 24 and a second, smaller bore portion 30 extending inwardly from first end face 22 (FIG. 3) to join portion 28 at shoulder 29.

A positioning collar 32 (FIGS. 1 and 11) extends circumferentially about holder body 20, which has a longitudinally extending positioning flat 33 formed on the upper (as viewed in FIGS. 1 and 3) surface thereof. In the known manner, collar 32 and positioning flat 33 cooperate to position the tool holder in a metal removal machine by abutting collar 32 against a stop provided on the machine.

Referring particularly to FIGS. 2 and 3, elongated tool mounting shaft 60 has a first, tool mounting portion 62 and a second, shaft mounting portion 64, with a shoulder portion 65 formed therebetween. The diameter of tool mounting portion 62 is such that it is receivable in a close-fitting, sliding relationship within the mounting passages 86 of shaft mounted members 74, 76, 76A, B and C and within enlarged portion 49H of bore 49 of biasing sleeve 46, all as more fully described hereinbelow. The diameter of tool mounting portion 62 is slightly larger than that of shaft mounting portion 64. The end of shaft 60 remote from body 20 has a shaft mounted stop means D comprising an enlarged end collar 66 affixed thereto. End collar 66 has a knurled portion 67 extending around the periphery thereof and a locator bar 69 (FIGS. 2 and 4) extending upwardly from and across the inner face 71 thereof. Shaft mounting portion 64 of shaft 60 includes an elongated threaded area 78 extending inwardly along the shaft from the end opposite that carrying the end collar 66.

A fluid conduit 61 extends through shaft 60 from threaded portion 78 to end collar 66. Along tool mounting portion 62 of shaft 60 fluid conduit 61 widens to form a slot-like fluid escape channel 63 along substantially the entirety of tool mounting portion 62.

Tool mounting, shaft engaging means C (FIGS. 1 and 3) comprises a nut-like element generally designated 34 having a front face 36, a rear face 38 and a threaded bore 40. The front portion of threaded bore 40, starting from the end adjacent front face 36, is adapted to receive the threaded portion 78 of mounting shaft 60. The rear portion of threaded bore 40, starting from the end adjacent rear face 38 is adapted to receive a hose fitting, as described hereinbelow. Locking means, comprising in this embodiment a pair of set screws 42, 44 extend through the side walls of nut-like element 34 into threaded bore 40 to help retain element 34 on mounting shaft 60 as will hereinafter be more fully described.

Referring particularly to FIG. 3, mounting shaft biasing means E is shown as comprising an elongated biasing sleeve 46 having a length approximately equal to that of holder body 20 and having an enlarged diameter portion 48 and a smaller diameter portion 50. A bore 49 extends through the longitudinal axis of elongated biasing sleeve 46. Bore 49 has an enlarged portion 49A at the enlarged diameter 48 end thereof. Enlarged diameter portion 48 is closely slideably received in smaller bore portion 30 of holder body 20. Elongated biasing sleeve 46 includes a front face 52 at the outermost end of the enlarged diameter portion 48 thereof, and a circumferential groove 47 adjacent front face 52.

A spring biasing member 54 is seated within enlarged bore portion 28, spring biasing member 54 having a diameter which is closely slideably receivable within bore 28.

The diameter of smaller bore portion 30, is, however, sufficiently less than the diameter of spring biasing member 54 so that the latter seats against shoulder 29 defined by the interface of bores 28 and 30.

A biasing retaining collar 56 is generally ring-shaped and has an outside diameter slightly less than the diameter of enlarged bore portion 28 and an inside diameter which permits it to be closely slideably received over smaller diameter portion 50 of inner biasing sleeve 46. A split snap-lock ring 58 can, in the known manner, be conveniently snapped into position into a circumferential groove formed near the end of smaller diameter portion 50 of inner biasing sleeve 46. The various components of biasing means E cooperate so as to constrain spring biasing member 54 to impose a continuous force biasing the mounting shaft longitudinally outwardly from the holder body.

A fluid supply hose 82 has a standard pipe-type coupling 84 at one end thereof and is threadably received in the rear portion of threaded bore 40, which is slightly flared outwardly to receive the cone-shaped coupling 84.

A description of each of the shaft-mounted members 74, 76, 76A, 76B and 76C followers; similar or identical construction features on the various shaft mounted members are identically numbered.

Each cutting tool member 74, FIGS. 2 and 6, comprises a generally disc-shaped member having a circular tool member mounting passage 86 formed through the center thereof, and cutting tool elements 88 extending radially outwardly therefrom. Mounting passage 86 is dimensioned to be closely slideably received over shaft tool mounting portion 62. The two cutting tool elements 88 are seen to be disposed at opposite ends of a diameter of the face of cutting tool member 74, i.e., are disposed at 180° intervals about the periphery of the face.

Tool element 88 includes the conventional cutting surfaces and may be manufactured from any convenient cutting tool material, such as, for example, tool steel or carbide. Disposed immediately adjacent the front or leading edge of element 88 is a relief area 89 which permits chip flow therefrom during the actual metal removal operation. A back up member 90 is positioned immediately to the rear of tool element 88 in order to provide rigidity for the tool member structure.

Locator pins 92 extend generally perpendicularly from both faces of cutting tool member 74, and are rigidly affixed thereto. Two such locator pins extend from each face forming a generally cylindrical protrusion therefrom. Pins 92 are positioned along a common diameter of the face of cutting tool 74 near the outer circumference thereof.

A pair of fan-shaped fluid release chambers 94 are cut into the face of cutting tool 74, and are defined by side walls 95. When tool elements 74 are mounted on tool mounting portion 62 of shaft 60 (FIG. 3), fluid release chambers 94 are seen to be in fluid flow communication with fluid escape channel 61 formed within tool mounting portion 62 of shaft 60.

Referring now to FIGS. 2 and 5, spacer member 76 is seen to be substantially disc-shaped with cut-away chip relief portions 70 formed thereon to complement chip relief area 89 on cutting tool member 74. Chip relief area 70 is formed between a chord line 73 and a ridge 75 and facilitate the escape of metal chip and curlings formed from the cutting or grooving of the workpiece. A locator groove 79 substantially rectangular in configuration is cut into that face of spacer member 76 which is to face end collar 66. Locator bar 69 and locator groove 79 are respectively sized so that bar 69 fits snugly but readily into groove 79 whereby end collar 66 and spacer member 76 are rigidly interlocked.

Spacer member 76 also has formed therein two locator holes 81 of generally cylindrical configuration which are formed therein on opposite sides of mounting passage 86 along a diameter of the face of spacer member 76. Locator holes 81 pass through the entire width of spacer member 76 and are sized, together with locator pins 92 on cutting tool member 74, so that pins 92 engage snugly but readily with holes 81, whereby upon insertion of pins 92 into holes 81, cutting tool 74 is rigidly interlocked with spacer member 76.

Referring now to FIGS. 2 and 7, a second spacer member 76A is substantially similar to spacer member 76 in overall design. (All the spacer members 74, 76, 76A and 76B are generally similar, each having a mounting passage 86, chip releaf area 70 and a generally disc-shaped configuration.) However, spacer member 76A is wider, i.e., extends over a greater distance along the longitudinal axis of shaft 60 than does spacer member 76. Also, locator holes 81 in spacer member 76A do not extend entirely through spacer member 76A, but separate holes 81 enter into the opposite faces of spacer member 76A a sufficient distance to receive and snugly engage locator pins 92 on the cutting tool member 74 adjacent to spacer member 76A. Also, on its left hand face, as viewed in FIG. 2, spacer member 76A contains a fluid release chamber 94 formed therein in substantially fan shape by cutting side walls 95 into the face of spacer member 76A. Fluid release chamber 94 is seen to be in fluid flow communication with fluid escape channel 63 and fluid conduit 61 of tool mounting portion 63 of shaft 60.

A chip relief area 70 is cut from member 76A and terminates in line 73 and ridge 75, in identical fashion to that on spacer member 76.

Spacer member 76B is identical to spacer member 76A except for the provision of a locator groove 79 in the left-hand face thereof (as viewed in the drawings) instead of pin locator holes.

This is shown with reference to FIGS. 2 and 8 wherein locator groove 79 extends across the face of spacer 76B. Spacer 76B, like all the cutting tool members and spacer members, has a mounting passage 86 formed therein through which tool mounting portion 62 of shaft 60 is slideably received.

Referring now jointly to FIGS. 2 and 9, flared spacer member 76C has an outer face 85 which is equal in diameter to the contact faces of the other shaft-mounted members. A locator bar 69 is formed thereon and extends substantially across the center of outer face 85. A flared collar portion 80 extends to a diameter substantially equal to that of first end face 22 of holder body 20 and has indicator means 14 engraved thereon. On the inner face (that facing holder body 20) of flared spacer member 76C, is a seating land 77. Disposed circumferentially thereabout is recessed abutment flange 83. As with all shaft-mounted members, mounting passage 86 extends through flared spacer member 76C, passing through locator bar 69 and face 85 thereof. Locator bar 69, on flared spacer member 76C, and locator groove 79, on spacer member 76B, are respectively sized so that the associated locator bar 69 may be snugly yet readily received within the associated locator groove 79 to interlock spacer member 76B with flared spacer member 76C.

In order to assemble the above-described tool holder, shaft mounted members consisting of cutting tool members 74 and spacer members 76, 76A, 76B and 76C are slipped, in the proper order, over disassembled shaft 60 from its threaded portion 78 end, the respective mounting passages 86 of the shaft mounted members being slideably closely received over shaft 60. Spacer member 76 interlocks with end collar 66 by means of the interlocking of their respective locator bar 69 and locator groove 79. Locator pins 92 of the next adjacent cutting tool member 74 interlocks with spacer member 76 by means of pins 92 engaging with locator holes 81 in spacer member 76. The other elements are assembled in the order shown in FIGS. 2 and 3, with adjacent members interlocking by means of the engagement of holes 81 with pins 92 and grooves 79 with bars 69. The last spacer member to be placed on the shaft, spacer member 76C, interlocks with spacer member 76B as described above, and seats within holder body 20, seating land 77 of spacer member 76C entering enlarged bore portion 28 in first end face 22 and therein abutting inner biasing sleeve 46 as more fully described below.

The distance between adjacent tool members 74 is, of course, set by the respective dimensions along the longitudinal axis of shaft 60 of the associated spacers 76, 76A, 76B and 76C. Thus, when it is desired to have the tool members disposed in a particular relationship to one another, it is merely necessary to select spacer members 76 of appropriate size. Also, if it is desired to use the holder with but a single cutting tool element thereon, or with more than the two cutting tool elements 74 illustrated, the selected number of cutting tool elements may be spaced at appropriate positions along tool mounting portion 62 of shaft 60 by merely arranging cutting tool elements and spacer members as desired. It will be apparent that the described structure provides a simple and versatile cutting tool member mounting arrangement. The interlocking of the cutting tool members 74 and spacers 76, 76A, 76B and 76C with end collar 66 provides a rigid, interlocked structure when the tool holder is completely assembled. Because no slot and key arrangement is required, the various tool members and spacer members slide easily and quickly over the entire length of the shaft upon assembly and disassembly. In prior structures, such as that disclosed in my prior copending application, it was necessary to slide members over the entire length of a keyway or equivalent interlocking structure which must extend for substantially the length of the tool mounting portion of the shaft and into holder body 20. In the improved design disclosed herein, the interlocking structure consists of locator means comprising recesses and projections, e.g., holes and pins, bars and grooves, the interlocking depth of which is never greater than the length (along the mounting shaft) of a single shaft mounted member, and may be considerably less. For example, the depth of the pin and hole connectors is considerably less than the width of spacer members 76, while nonetheless providing a rigid, secure interlocking structure.

The various locator means disposed on the respective faces of the shaft mounted members are hereinafter and in the claims sometimes referred to as "member locator means" to distinguish them from the shaft-carried locator means on end collar 66.

It will be noted that shaft mounted members 74, 76, 76A, 76B and 76C are so disposed on shaft 60, that the member locator means are arranged "respectively in alternating sequence" as protrusions (drive bars 79 and pins 92) and recesses (grooves 69 and holes 81). The quoted phrase, as used in the claims, means that the locator means are sequentially arranged with protrusions facing recesses so as to permit interlocking thereof.

"Complementary-shaped" means that the protrusions and recesses so described interlock one with the other so that relative rotation therebetween is precluded.

With cutting tool members 74 and spacer members 76, 76A, 76B and 76C assembled on shaft 60, shaft mounting end 64 of shaft 60 is passed through bore 49 of elongated biasing sleeve 46, with the inner end of tool mounting portion 62 of shaft 60 being received in enlarged bore 49A, and shaft mounting portion 64 extending through the remainder of bore 49. The assembly of shaft 60, shaft-mounted members 74, 76, 76A, 76B and 76C and elongated biasing sleeve 46 is inserted into smaller bore portion 30 of holder body 20 from first end face 22. Shaft 60 is advanced until recessed flange 83 of shaft-mounted member 76C abuts end face 22 and seating land 77 engages the front face 52 of sleeve 46. (FIGS. 3 and 11.) Set screws 43, 45 are then advanced inwardly so as to engage circumferentially extending groove 47. Next, spring biasing member 54 is inserted into the annular opening defined between the outer surface of smaller diameter portion 50 of elongated biasing sleeve 46 and the inner surface of enlarged bore portion 28. Then, biasing retaining collar 56 is placed into position and secured by split snap-lock ring 58. With this arrangement, spring biasing member 54 exerts a constant pressure against collar 56 to force mounting shaft 60 axially into holder body 20.

Nut-like element 34 is then threaded onto threaded end portion 78 of shaft 60 until the front face 36 of element 34 engages the adjacent face (unnumbered) of biasing sleeve 46. Set screws 42, 44 are then advanced inwardly to engage threaded portion 78. Except for the connection to fluid supply hose 82, as described hereinbelow, the assembly is completed and the tool holder may be mounted in a metal removing machine in the known manner, collar 32 and positioning flat 33 serving to align the tool holder against corresponding elements of the metal removal machine. The interlocked shaft and shaft-mounted members are held in rigid, unitary alignment with holder body 20 by the combined, cooperating forces of tool mounting shaft engaging means C and mounting shaft biasing means E. Yet, as described below, the assembly may be readily loosened, and shaft 60 and its associated interlocked shaft mounted members rotated with respect to holder body 20 through a full 360° to any desired position relative thereto in infinitesimal increments, and re-tightened into a unitary, aligned structure.

Fluid supply hose 82 may be connected to the tool holder by means of a coupling 84 having a threaded outer surface which is threadably engaged with the outwardly flared portion of threaded bore 40 of nut-like element 34. In use, a cooling or cutting fluid, for example water, is supplied through fluid supply hose 82 as indicated by the arrow in FIGS. 1 and 3, passes through fluid conduit 61, thence through fluid escape channel 63 and fluid release chambers 94 of shaft-mounted members 74 and 76.

Although the general concept of supplying a cooling or cutting fluid to a workpiece during a metal removal operation is well known in the art, the structure provided herein permits application of the fluid at the point of cutting in a precise and efficient manner, even when the cutting tool is employed in areas of the work which make external application of a fluid difficult or impossible.

As a further feature, set screws 43, 45 and nut-like element 34 may be backed off slightly from their normal, tightened retaining portions to permit rotation of inner biasing sleeve 46, tool mounting shaft 60 and shaft-mounted members 74, 76 all relative to holder body 20.

As illustrated in FIG. 1, indicating means 14 and indicia 16 show the zero or normal position between these two elements. However, as the cutting elements 88 are used, they become dull and must periodically be resharpened or reground. Such resharpening and use reduces the distance which tool elements 88 extend radially outwardly from the mounting shaft. Thus, if the total amount of material removed in the resharpening operation is known, the shaft-mounted members, including cutting tools 74, mounting shaft 60 and inner biasing sleeve 46 can be rotated relative to holder body 20 until indicator means 14 is opposite the particular one of indicating indicia 16 which corresponds to the amount of material removed. This rotation extends the cutting edges of cutting elements 88 a distance equivalent to the length of the material removed from elements 88 and compensates for the shortening thereof without requiring readjustment of the entire metal cutting machine as was heretofore the case.

Also, indicating means 14 and indicia 16 provide means whereby the tool members may be relocated during a machining operation so as to provide ease of accomplishing a particular cut or depth of groove. Of course, any desired type of indicating means and indicia can be employed. However, it has been found that the most useful type of indicia are those which show in a linear dimension, i.e., thousandths of an inch increments, the change in the effective length of the radial extension of cutting elements 88 from the shaft.

Figure 12:
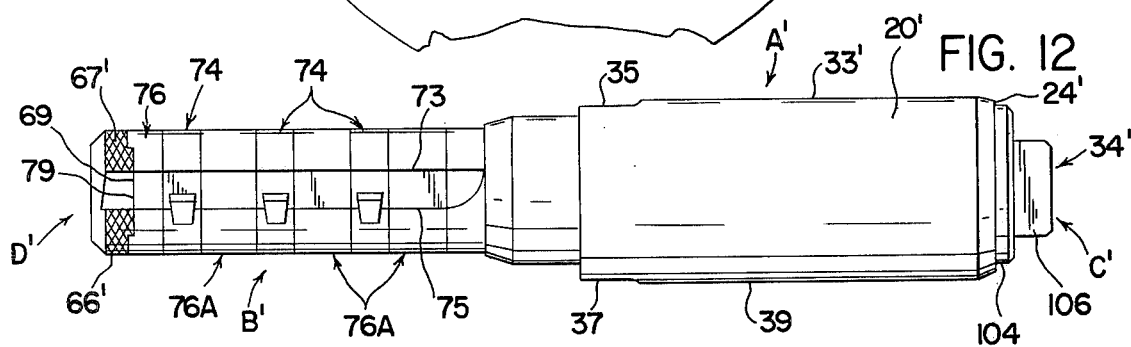
FIG. 12 is a side view in elevation of a tool holder comprising a second embodiment of the invention.
Figure 13:
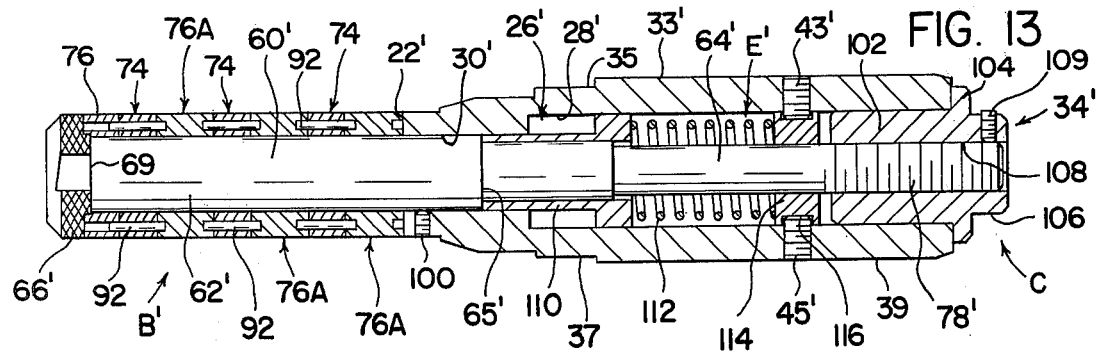
FIG. 13 is a longitudinal cross-sectional side view of the tool holder of FIG. 12; and, FIG. 14 is an exploded view, with parts broken away, of the tool holder of FIG. 12.
Figure 14:
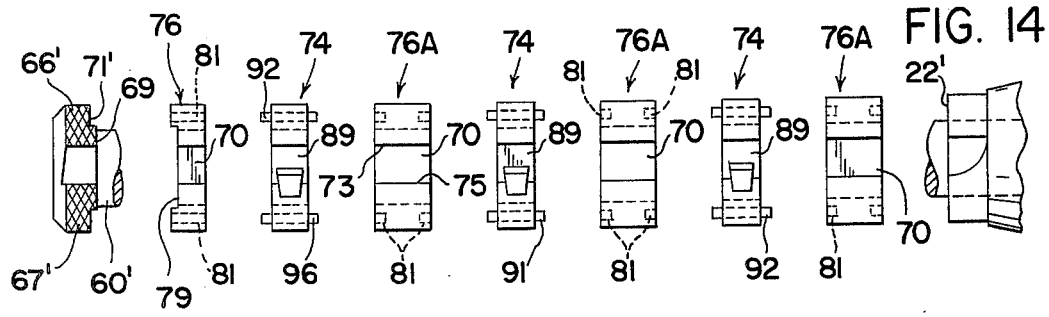

A second embodiment of the tool holder of the invention is shown in FIGS. 12, 13 and 14. Parts thereof which closely correspond to parts of the embodiment of FIGS. 1, 2 and 3 are numbered with identical corresponding numbers primed. Shaft mounted members 74, 76 and 76A are the same in both embodiments, and carry identical numbers. The description in detail of parts identical to or closely similar to corresponding parts in the FIGS. 1, 2 and 3 embodiment is not repeated, their structure and use being clear to those skilled in the art from the earlier description thereof.

Referring now to FIGS. 12, 13 and 14, tool holder body A' is comprised of an elongated body 20' having a first end face 22' and a second end face 24'. A bore 26' extends longitudinally through the body (FIG. 13) between first and second end faces 22', 24'. Bore 26' includes a first, enlarged diameter bore portion 28' extending inwardly from second end face 24' and a second, smaller diameter bore portion 30' extending inwardly from first end face 22' to join portion 28'. As can best be seen in FIG. 13, enlarged diameter bore portion 30' extends for most of the length of body 20'. Disposed on the upper portion (as viewed in FIG. 12) of the outer peripheral surface of body 20' and extending generally longitudinally therealong are positioning flats 33', 35 of the type known for use in machine tools for positioning purposes. A corresponding pair of positioning flats 37, 39 are disposed on opposite or lower portion of the outer peripheral surface of body 20', as shown in the section view of FIG. 13. For reasons which will hereinafter become apparent, a pair of set screws 43', 45' are threadably received in body 20' generally midway between the first and second end faces 22', 24' (FIG. 13) so as to extend through threaded openings in the side walls of body 20' and into enlarged bore portion 28' of bore 26'. Similarly, a set screw 100 extends through a threaded opening in the side wall of body 20' adjacent first end face 22' and into bore portion 30', for reasons which also will be made clear hereinbelow.

Elongated tool mounting shaft 60' has a first, tool mounting portion 62' and a second, shaft mounting portion 64'. The diameter of tool mounting portion 62' is such that it is receivable in a close fitting, sliding relationship within smaller diameter bore portion 30', and has a shoulder 65' formed therebetween. At the end of shaft 60', remote from body 20', an enlarged end collar 66' is affixed to the end of shaft 60'. End collar 66' has a knurled portion 67' extending around the periphery thereof and a locator bar 69' extending across the inner face 71' thereof, similar to that described with respect to end collar 66' of the embodiment of FIGS. 1, 2 and 3. Shaft mounting portion 64' of shaft 60' includes an elongated threaded area 78' extending inwardly along the shaft from the end opposite that carrying the end collar 66'.

Tool mounting shaft engaging means C' is comprised of a nut like element 34' having a first portion 102 of a diameter which permits it to be closely slideably received within enlarged bore portion 28', a collar portion 104 having a diameter greater than the diameter of enlarged bore portion 28', and a tightening portion 106 which is shaped to engage a wrench for tightening. Element 34' has a threaded longitudinal bore 108 which permits it to be screwed onto threaded area 78' of shaft 60'. A set screw 109 extends through a threaded opening in the side wall of tightening portion 106 into bore 108 to provide holding means for element 34' relative to threaded portion 78'.

Referring to FIG. 13, mounting shaft biasing means E' is shown as comprising a first biasing sleeve 110, a spring biasing member 112 and a second biasing sleeve 114. Sleeves 110, 114 each have a bore (not numbered) extending therethrough with a diameter large enough to permit shaft 60' to be closely slideably received therethrough. Sleeve 114 has a circumferentially extending groove 116 thereon, which is adapted to receive set screws 43', 45' to retain the sleeve in the desired position relative to the body so as to constrain spring member 112 to impose a continuous force biasing the mounting shaft longitudinally outwardly from the holder body.

Cutting tool mounting portion B' of the tool holder has cutting tools 74 and spacer members 76 and 76A mounted thereon. These are identical in every respect to those illustrated with regard to FIGS. 1, 2 and 3 except that, since no provision for a fluid conduit is made in this embodiments the fluid release chambers need not be provided in the shaft mounted members. Naturally, the embodiment of FIGS. 12 and 13 may readily be provided with a fluid conduit if desired. Further, shaft mounted members with fluid release chambers may be employed on the embodiment of FIGS. 12, 13 and 14, even though it has no fluid conduit, thus avoiding the necessity to stock two different types (with and without fluid release chambers) of shaft mounted members.

In order to asssemble the above-described tool holder, cutting tool members 74 and spacer members 76 and 76A are slipped in the proper order over disassembled shaft 60' from its threaded end portion 78'. Spacer member 76 interlocks with end collar 66' by means of the interlocking of the locator bar 69 and locator groove 79 as previously described. Locator pins 92 of the next adjacent cutting tool member 74 interlocks with spacer member 76 by means of pins 92 engaging with locator holes 81 in spacer member 76. As described above with respect to the embodiment of FIGS. 1, 2 and 3, the other elements are assembled in the order shown in FIGS. 12, 13 and 14, with adjacent members interlocking by means of the engagement of holes 81 with pins 92. The last spacer member 76A to be placed on shaft 60' abuts end face 22 of holder body 20' without engagement of the holes 81 in the abutting face of member 76A. First sleeve 110 has a small end portion 110a and a collar portion 110b.

With cutting tool members 74 and spacer members 76 and 76A assembled on shaft 60', and shaft 60' inserted into holder body 20', first sleeve 110, spring biasing means 112 and second sleeve 114, respectively, are placed over mounting shaft 60' from threaded end portion 78', small end portion 110a of first sleeve 110 abutting shoulder 65'. With sleeve 114 properly positioned, locking means comprising in this embodiment set screws 43', 45' are advanced within their threaded holes so as to engage a groove 116 on both sides of second biasing sleeve 114, thereby retaining first sleeve 110 and second sleeve 114 and spring biasing means 112 in position within bore 26'. The tool mounting shaft engaging means C' is next placed over threaded portion 78' of shaft 60' and advanced thereon until collar portion 104 engages second end face 24' of holder body 20' so as to axially draw shaft 60' towards second end face 24' of holder body 20'.

It will be seen that the tool holder of the invention provides great flexibility in that any arrangement of cutting tools and spacers may be employed as desired to give a selected cut or grooving operation. The shaft may be rotated to any desired position relative to the holder body prior to tightening the tool mounting shaft engaging means. Accordingly, the rotational orientation of the shaft (and its associated shaft mounted members) may be changed as desired. For example, when cutting tool members with two or more cutting elements thereon are used, the members may be rotated to precut selected ones of the cutting tool elements to the workpiece, as when the first set has been worn out.

Further, although it is preferable that the shaft be secured to the holder body in a manner as described above which permits free rotation of the shaft and its associated shaft-mounted members within the body, it is also within the scope of the invention to provide interlocking means between the shaft member adjacent the holder body and the body holder. This is readily done by simply providing locator means, e.g., a drive bar, and the first end face of the holder body and corresponding complementary locator means, e.g., a groove on the shaft mounted face which abuts the holder body first end face. Such a postive interlock between the shaft mounted members and the holder body of course precludes infinitesimal increments of rotation between the shaft and the holder body as is provided by the preferred embodiments. As a practical matter, it would limit the shaft to two positions relative to the holder body, 180° of rotation apart, with the specific locator means illustrated in the preferred embodiments.

Although the invention has been described in detail with reference to specific preferred embodiments thereof, it is apparent that other modifications and alterations will occur to those skilled in the art upon the reading and understanding of this specification. It is intended to include all such modifications and alterations within the scope of the appended claims.

What is claimed is:

1. A cutting tool holder for securing at least one apertured cutting tool in a desired spaced relationship to a metal removal machine as said cutting tool is selectively engaged with a workpiece for performing a cutting operation, said holder comprising:

an elongated holder body having a longitudinal axis and a first end face, a bore extending longitudinally through said first end face and said body;

an elongated shaft axially displaceable relative to said body and having a tool mounting portion and a shaft mounting portion, said tool mounting portion extending outwardly of said body from said first end face and slidably and rotatably receiving said apertured cutting tool, and said shaft mounting portion being received in said bore and extending substantially longitudinally through said holder body from said first end face, stop collar means fixed on said tool mounting portion of said shaft and spaced from said holder body, said cutting tool being axially positioned on said tool mounting portion between said collar means and said first end face, means interengaging said cutting tool and stop collar means to prevent rotation of said cutting tool relative to said shaft and including axially opposed cooperably interengaged means, and means releaseably interconnecting said shaft and said body to axially position said stop collar means relative to said first end face to axially capture said cutting tool and retain said opposed means in interengagement, said means releaseably interconnecting said shaft and said body including spring means received in said bore and biasing said shaft in the direction to displace said stop collar means toward said first end face.

2. The tool holder of claim 1, wherein said means releaseably interconnecting said shaft and said body portion includes an elongated biasing sleeve in said bore and slidably received over said mounting portion of said shaft, said biasing sleeve having a length approximately equal to the length of said holder body, means for maintaining said biasing sleeve in a desired position relative to said bore, said bore having a shoulder radially outwardly of said sleeve, and a retaining collar on said sleeve spaced from said shoulder in the direction toward the end of said holder body opposite said first end face, said spring means surrounding said sleeve and having opposite ends engaging said shoulder and retaining collar.

3. The tool holder of claim 21, wherein said mounting portion of said shaft has a threaded end adjacent said end of said holder body, and a nut threaded on said threaded end of said mounting portion and axially engaging said sleeve adjacent said end of said holder body to position said shaft longitudinally of said sleeve.

4. The tool holder of claim 3, and means for locking said nut in a selected axial position relative to said threaded end of said mounting portion of said shaft.

* * * * *